(No Model.)

A. WOEBER.
TWO WHEELED VEHICLE.

No. 277,968.     Patented May 22, 1883.

Witnesses:
G. B. Towle
J. Walter Cooney

Inventor:
Amos Woeber
By W. T. Burris
Attorney.

N. PETERS, Photo-Lithographer, Washington, D. C.

UNITED STATES PATENT OFFICE.

AMOS WOEBER, OF DAVENPORT, IOWA.

TWO-WHEELED VEHICLE.

SPECIFICATION forming part of Letters Patent No. 277,968, dated May 22, 1883.

Application filed February 9, 1883. (No model.)

*To all whom it may concern:*

Be it known that I, AMOS WOEBER, a citizen of the United States of America, residing at Davenport, in the county of Scott and State of Iowa, have invented certain new and useful Improvements in Driving-Carts, of which the following is a specification, reference being had therein to the accompanying drawings.

My invention relates to improvements in two-wheel vehicles; and it consists in the construction and arrangement of the springs and connecting devices for supporting the body of the cart, as hereinafter fully described.

Figure 1:
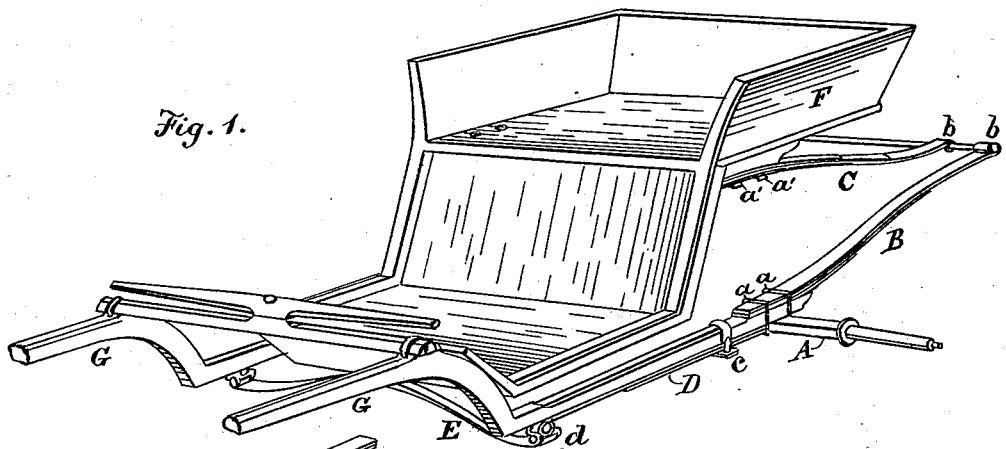
Figure 2:
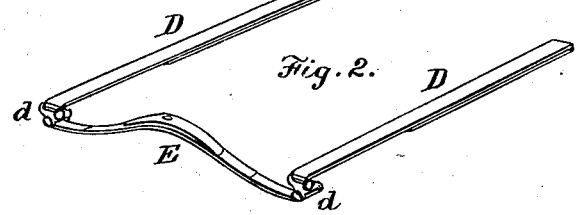
Figure 3:
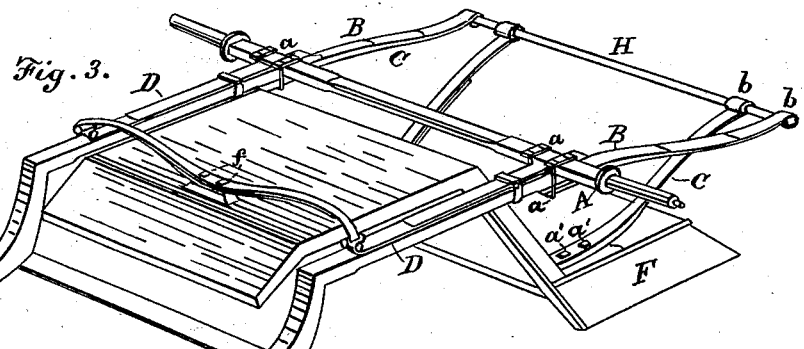
Figure 4:
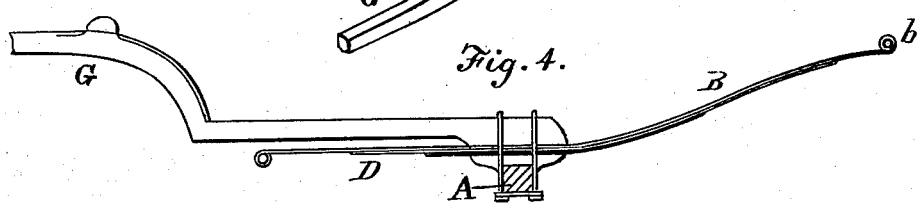

Figure 1 is a perspective of the vehicle. Fig. 2 is a perspective of the front springs detached. Fig. 3 is a perspective of the under side of the vehicle. Fig. 4 shows a modification of the construction and mode of attaching the forward and back side springs.

A is the axle of the vehicle. B B C C represent the rear supporting springs, and D D E represent the front supporting springs of the vehicle-body F. The front ends of the springs B are fastened on the top of the back portion of the shafts G by means of the clips $a\ a$, which clips also fasten the shafts to the axle, and the forward ends of the springs C are bolted at $a'\ a'$ to the under side of the body F. The back ends of these springs B C are provided with eyes $b$ to receive the connecting-bar H. The back ends of the springs D D are fastened below the shafts by the clips $c$, and the forward ends of these springs are connected with the cross-spring E by the double couplings $d$, which spring E is fastened at the middle to the bottom of the forward end of the body by bolts $f f$.

The springs C C may be arranged any required distance from each other and from the springs B, so that each spring may have free play and may pass without interfering with each other. The clips holding the springs D may be adjusted forward or backward on the shafts to regulate the elasticity of the springs as required, and these springs, being under the shafts and fastened at the back part thereof, allow the requisite up and down motions of the shafts.

This construction and arrangement of the supporting-springs and their connecting devices are very simple and comparatively inexpensive, and make a very pleasant riding-vehicle.

Instead of making and attaching the springs B D separately, as described, and shown in Figs. 1 and 2, they may be made in one and attached as shown in Fig. 4.

What I claim as new, and desire to secure by Letters Patent, is—

1. In a two-wheel vehicle, the combination of the springs B B, attached to the axle and the shafts by the clips $a\ a$, the springs C C, attached to the rear part of the body F, and the bar H, arranged in the eyes $b$ of the springs, substantially as and for the purposes described.

2. In a two-wheel vehicle, the combination of the springs D D, attached to the shafts G, and the spring E, attached to the front part of the body F, and connected with the springs D D by the double couplings $d$, substantially as and for the purposes described.

3. The combination, with the springs B B C C, body F, and connecting-bar H, of the adjustable springs D D and connecting front spring, E, substantially as and for the purposes described.

In testimony whereof I affix my signature in presence of two witnesses.

AMOS WOEBER.

Witnesses:
 AMS. WOEBER,
 WILLIAM O. SCHMIDT.